United States Patent
Moore

(10) Patent No.: US 7,193,391 B2
(45) Date of Patent: Mar. 20, 2007

(54) METHOD FOR CELL BALANCING FOR LITHIUM BATTERY SYSTEMS

(75) Inventor: Stephen W. Moore, Fishers, IN (US)

(73) Assignee: Enerdel, Inc., Fort Lauderdale, FL (US)

( * ) Notice: Subject to any disclaimer, the term of this patent is extended or adjusted under 35 U.S.C. 154(b) by 405 days.

(21) Appl. No.: 10/916,785

(22) Filed: Aug. 12, 2004

(65) Prior Publication Data

US 2006/0033475 A1   Feb. 16, 2006

(51) Int. Cl.
 *H01M 10/44* (2006.01)
 *H01M 10/46* (2006.01)
(52) U.S. Cl. ....................... 320/116; 320/132
(58) Field of Classification Search .............. 320/107, 320/112, 116, 118, 119, 132, 149; 324/426, 324/430, 433
See application file for complete search history.

(56) References Cited

U.S. PATENT DOCUMENTS

| 5,578,915 | A  | * | 11/1996 | Crouch et al. | 324/428 |
| 6,356,083 | B1 | * | 3/2002  | Ying          | 324/426 |
| 6,394,208 | B1 |   | 5/2002  | Hampo         | 180/65.2 |
| 6,639,385 | B2 | * | 10/2003 | Verbrugge et al. | 320/132 |

* cited by examiner

*Primary Examiner*—Edward H. Tso
(74) *Attorney, Agent, or Firm*—Howard & Howard Attorneys, P.C.

(57) ABSTRACT

A rechargeable multiple cell battery pack has an application associated therewith that draws power from the battery pack. While the battery pack is in operation, voltage, current, state-of-charge (SOC), and impedance data are collected on a per-cell basis and an algorithm is performed to determine a state-of-charge for each individual cell of the battery pack consistent with predetermined criteria. The individual cells are charged to the respective, determined state-of-charge (SOC) levels.

17 Claims, 2 Drawing Sheets

METHOD FOR CELL BALANCING FOR LITHIUM BATTERY SYSTEMS

TECHNICAL FIELD

The invention relates generally to energy storage devices such as rechargeable batteries, and in particular to a method of charging these devices.

BACKGROUND OF THE INVENTION

It is known in many applications, including self-propelled vehicle applications as seen by reference to U.S. Pat. No. 6,394,208 entitled "STARTER/ALTERNATOR CONTROL STRATEGY TO ENHANCE DRIVEABILITY OF A LOW STORAGE REQUIREMENT HYBRID ELECTRIC VEHICLE" issued to Hampo et al., to employ a dynamoelectric machine in a first mode as a motor in order to provide propulsion torque. In such applications, it is also known to reconfigure the dynamoelectric machine in a second mode as a generator, in order to capture and convert some of the potential or kinetic energy associated with the application into output electrical power, a process known as regeneration ("regenerative energy"). Moreover, in such applications, it is also known to provide an energy system, such as a battery, to power the dynamoelectric machine when operated as a motor, and to receive the regenerative energy when the dynamoelectric machine is operated as a generator. In the latter case, the regenerative energy is generally operative to increase the state of charge of the battery, until such battery is "fully" charged. Battery technologies typically used in such applications include nickel metal hydride (NiMH), lead acid (PbA) and nickel cadmium (NiCd) technologies, although energy systems employing lithium chemistry technologies, while not as prevalent as other battery technologies, are also used in practice.

The optimization of the battery is affected by the charging regimen. Presently, most optimization is done during the design phase of the battery, as opposed to "real time" optimization done while the battery is in use. Fixed charging routines based upon "expected" customer usage cycles are developed, and the battery is designed around these expected cycles. The battery is balanced to a target state-of-charge (SOC) during the design phase based upon these expected cycles of usage of the battery. That target SOC is the SOC to which the battery is balanced for the life of the battery. The life of the battery, therefore, may be considerably shortened if the target SOC based upon design projections is not optimal as compared to the "real-time" use. Other fixed charging strategies include strategies designed to achieve maximum energy storage (and output) without regard to incorporating power-based needs (such as frequent stopping and starting of a dynamoelectric machine) or the ability of the battery to absorb regenerative energy. Such fixed charging strategies are only appropriate for discharge-only products as opposed to rechargeable products.

These existing methods, while adequate, do not allow for the most useful method of optimization. Existing methods, as set forth above, neither provide for "real time" adaptation of the charging regimen to the battery while it is in use, nor do they take into account the varied applications with which a battery may be used. For example, it would generally be desirable to charge the battery to its highest possible SOC to provide the greatest range or longest duration use for the application running off the battery. However, such an approach is generally not considered optimal for more dynamic applications that involve the acceptance of regenerative energy. A lower SOC allows the battery to be at an optimal charge level to accept regenerative energy or provide dynamic power functions (repeated charging and discharging cycles).

Multiple cell lithium chemistry batteries in particular present specific challenges when developing battery charging regimens. Each cell within a multiple-cell lithium battery will have its own unique electrical characteristics, including impedance levels and SOC. If the desired battery design entails maximum energy output, one cell may need to be charged more fully than another cell within the battery. If the electrical characteristics of each cell are not tracked, the charging regimen can not result in a battery optimal for the designed use, as the regimen will be adjusted to accommodate the best performing cell. This is necessary to prevent overcharging of the cells; lithium chemistry batteries are intolerant to such overcharging. Likewise, if the battery charging design requires the battery to have capacity to accept regenerative energy, providing and accepting energy in a dynamic state as opposed to providing energy in a steady-state situation, the regimen will not provide a battery with optimal charge. The optimal SOC for each cell in those circumstances varies between cells and a "one size fits all" SOC charging strategy will not be optimum.

Therefore, there exists a need for a method that allows the cells of a battery pack to be charged to specific and individual SOC levels, unique and optimal to each individual cell, based upon data collected during the battery's operation, thereby minimizing or eliminating one or more of the above-identified problems.

SUMMARY OF THE INVENTION

An object of the present invention is to solve one or more of the problems as set forth above. One advantage of the present invention is that it allows each individual cell of the battery to be charged to a SOC specific to that cell. The respective state-of-charge levels are determined while the battery is in use. "Real-time" data corresponding to the actual use is used to determine a load profile. The load profile is the energy delivery and regenerative energy acceptance characteristics presented to the battery by the application. This load profile, in addition to impedance measurements, is used to determine a specific SOC for each cell for improved battery performance.

These and other features, objects, and advantages are realized by the present invention, which includes a method of controlling a rechargeable multiple cell battery pack. The method includes the step of determining a desired level of energy delivery and a desired level of regenerative energy acceptance for the battery, based upon data corresponding to the electrical characteristics of the battery cells observed during the battery's operation. The method also includes the step of performing an algorithm to determine a target SOC for each cell, based upon the desired levels of energy delivery and regenerative energy acceptance, and charging the individual cells of the battery to the respective, target SOC levels. A rechargeable battery pack and an energy system that includes an energy storage device are also presented.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
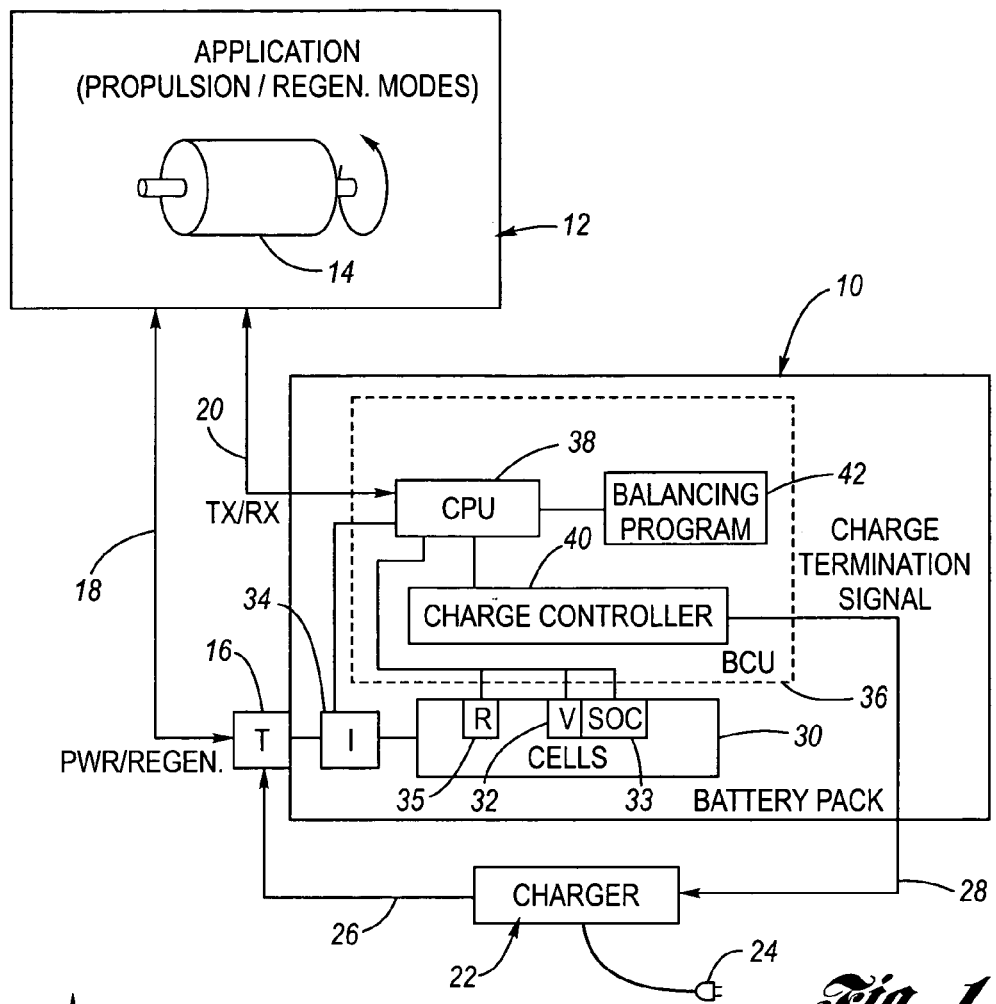
FIG. 1 is a simplified schematic and block diagram view of a battery pack according the present invention, in an exemplary embodiment.

Referring now to the drawings wherein like reference numerals are used to identify identical components in the various views, FIG. 1 is a simplified, schematic and block diagram view of a battery pack 10 according to the invention suitable for use in connection with any one or more of a plurality of exemplary applications 12. Application 12, in the illustrated embodiment, may be of the type employing a dynamoelectric machine 14, which may alternatively be configured for operation (i) in a first mode wherein the machine 14 is used for propulsion torque, or (ii) in a second mode different from the first mode wherein the machine 14 is configured for the production of regenerative energy (i.e., it is configured as a generator). For example, such applications may include, but are not limited to, self-propelled vehicle applications, although other application stationary in nature (i.e., rotating systems having loads with inertia) are also included within the spirit and scope of the invention. Dynamoelectric machine 14 may comprise conventional apparatus known to those in the art, for example only, AC or DC electric motors, brush-based or brushless electric motors, electromagnet or permanent magnetic based electric motors, reluctance-based electric motors, or the like. It should be clearly understood that the foregoing is exemplary only and not limiting in nature.

Battery pack 10 includes an input/output terminal 16, a power bus 18, a communications line 20, a charger 22, a means or circuit such as conventional wall plug 24 for charger 22 to receive power, a power line 26, a control line 28, battery cells 30, a voltage sensor 32, a state of charge (SOC) sensor 33, a current sensor 34, and an impedance measuring device 35.

Battery pack 10 also includes a battery control unit (BCU) 36, which includes a central processing unit (CPU) 38, a charge controller 40, and a balancing program 42. The present invention is, therefore, adapted to establish a way for rechargeable battery pack 10 to maximize performance by continuously adapting its charging regimen to the particular type of usage cycle, charging based upon calculations providing a desired amount of energy delivery or a desire to allow acceptance of regenerative energy. By utilizing the functionality of this invention, users of battery pack 10 are thereby able to extract optimal performance from battery pack 10 that is otherwise unattainable in the conventional art.

With continued reference to FIG. 1, battery pack 10 may include an input/output terminal 16, designated "T" (for Terminal) in the drawings. A power bus 18, designated "PWR/REGEN." in the drawings, is configured to allow electrical power to be drawn for energy system 10 when dynamoelectric machine 14 is operated in a first, propulsion torque mode. Power bus 18 alternatively may be configured or used to carry electric energy, hereinafter referred to as regenerative energy, produced by dynamoelectric machine 14 when operated in the second, regenerative energy production mode (as a generator). As further shown, in the illustrated embodiment, battery pack 10 may also include a communications port configured for connection to a communications line 20, designated "TX/RX" (transmit/receive) in FIG. 1. Communications line 20 may be configured for bi-directional communications, for example control signals or control messages, between battery pack 10 and application 12.

FIG. 1 also shows an electrical battery charger 22, including in exemplary fashion a conventional electrical plug 24 for connection to a wall outlet (not shown) or the like. Charger 22 is configured for charging (or recharging) battery pack 10. Charger 22 includes a charging power line 26 configured for connection to battery pack 10 for charging (or recharging) cells 30 of battery pack 10, although for simplicity's sake, line 26 is shown connected to the I/O terminal 16 (PWR/REGEN.). In addition, charger 22 may have an input configured to receive a control signal, such as a charge termination signal, on a control line 28 from battery pack 10. The charge termination signal on line 28 is configured to cause charger 22 to discontinue charging battery pack 10 (i.e., to stop charging), for example, when battery pack 10 has been charged to a calculated level according to the invention, as described in greater detail below. Alternatively, charger 22 may be a variable charger 22 wherein the control signal on line 28 is operative to adjust the charging current as well as to terminate the charge current. Charger 22 may comprise conventional charging componentry known to those of ordinary skill in the art.

In the illustrated embodiment, battery pack 10 includes one or more battery cells 30, at least one voltage sensor 32, a SOC block 33, a current sensor 34 and an impedance block 35. Cells 30 are configured to produce electrical power, each cell 30 having a respective terminal (not shown for clarity) to deliver and receive electrical current and allow electrical measurements to be taken for each cell 30. The cells 30 may be arranged so that the collective output thereof is provided on I/O terminal 16, as in the illustrated embodiment. Conventional electrical current, directionally speaking, flows out of the respective cell terminals through battery pack terminal 16 to the load (i.e., the dynamoelectric machine 14) in application 12. Cells 30 are also configured to be rechargeable, for example, by receiving conventional electrical current into battery pack 10 at I/O terminal 16, then transmitted to the individual cell terminals. The recharging current may be from either charger 22 or from machine 14 operating as a generator. Cells 30 may comprise conventional apparatus according to known battery technologies, such as those described in the Background, for example, NiMH, PbA, or NiCd, or the like. In a preferred embodiment, however, cells 30 comprise cells formed in accordance with various Lithium chemistries known to those of ordinary skill in the energy storage art. In the illustrated embodiment, cells 30 are arranged to produce a direct current (DC) output at a predetermined, nominal level (e.g., 80 volts at 100% of full state of charge). However, this is exemplary rather than limiting in nature.

Voltage sensor 32 may be configured to measure the voltage level being provided to application 12 from battery pack 10 and produce a voltage indicative signal representative of the measured voltage. In one embodiment, one voltage sensor 32 is provided to detect the overall voltage output of the combination of cells 30. In a preferred embodiment, however, a plurality of voltage sensors 32 (the plurality not being shown for clarity) are employed, at least one for each individual cell included in battery pack 10. Voltage sensor(s) 32 may comprise conventional apparatus known in the art.

SOC block 33 may be configured to determine the State of Charge (SOC) of battery pack 10 or individual cells thereof. In a preferred embodiment, the SOC of each cell 30 can be measured using voltage measurements in combination with predetermined SOC data (e.g., a table) and then recorded and tracked. These measurements provide data for balancing program 42 to determine a respective, target SOC for each cell, as well to know when cell 30 has been "fully" charged. SOC sensor(s) 33 may comprise software configured to generate a SOC level using voltage/SOC data mentioned above conventional apparatus known in the art.

Current sensor 34 may be configured to detect the current being drawn by application 12 from battery pack 10, and generate, in response, a current indicative signal representative of the measured current level (as well as polarity or direction of current flow). Because cells 30 are connected in series, only one current sensor 34 is needed. Current sensor 34 may comprise conventional apparatus known in the art.

Impedance block 35 may be configured to measure an internal AC or DC impedance of battery pack 10 or individual cells thereof. Impedance block 35 may be configured for determining a respective impedance for each individual cell 30 of battery pack 10. The internal impedance of each cell 30 can then be determined, recorded and tracked. Impedance block 35 may involve separate voltage measuring devices (such as DC or AC load testers) or may be software-based, using data from voltage sensor(s) 32 and current sensor(s) 34 to calculate internal impedance of cells 30 by well known algorithms, perhaps time-based, e.g., Ohm's Law (voltage=current*impedance). Thus, impedance block 35 may comprise conventional approaches for determining impedance. Voltage sensor(s) 32, SOC block 33, current sensor 34 and impedance block 35 define the means for determining the desired energy delivery levels for battery pack 10 and individual cells 30 thereof.

Battery Control Unit (BCU) 36 is configured for controlling the overall operation of battery pack 10, including the adjustments to the charging strategy according to the invention. CPU 38 may comprise conventional processing apparatus known in the art, capable of executing preprogrammed instructions stored as cell charge balancing program 42, all in accordance with the functionality as described herein. In this regard, balancing program 42 is coupled to CPU 36, and may comprise conventional lithium energy control (LEC) hardware that has cell charge termination level setting capabilities that allow the individual cells 30 to be charged to a respective target SOC levels based upon the inventive processing of dynamically produced data, such as voltage and current measurements. CPU 36 and balancing program 42 comprise the means to determine the respective target SOC levels for the individual cells 30. Balancing program 42, through CPU 36, provides data to charge controller 40 so that the charge controller will charge cells 30 in accordance with the particular usage cycle being presented to the battery pack 10. Charge controller 40, which may also be controlled through software, defines the means for controlling any subsequent recharging of battery pack 10 (i.e. cells 30). It should also be understood that battery pack 10 may include controllable switches or the like (not shown), controlled by controller 40 that would be operative to discontinue charging as to selected cells 30 but otherwise allow charging to continue to the remaining cells 30, all in accordance with the respective, target SOC levels established according to the present invention.

Figure 2:
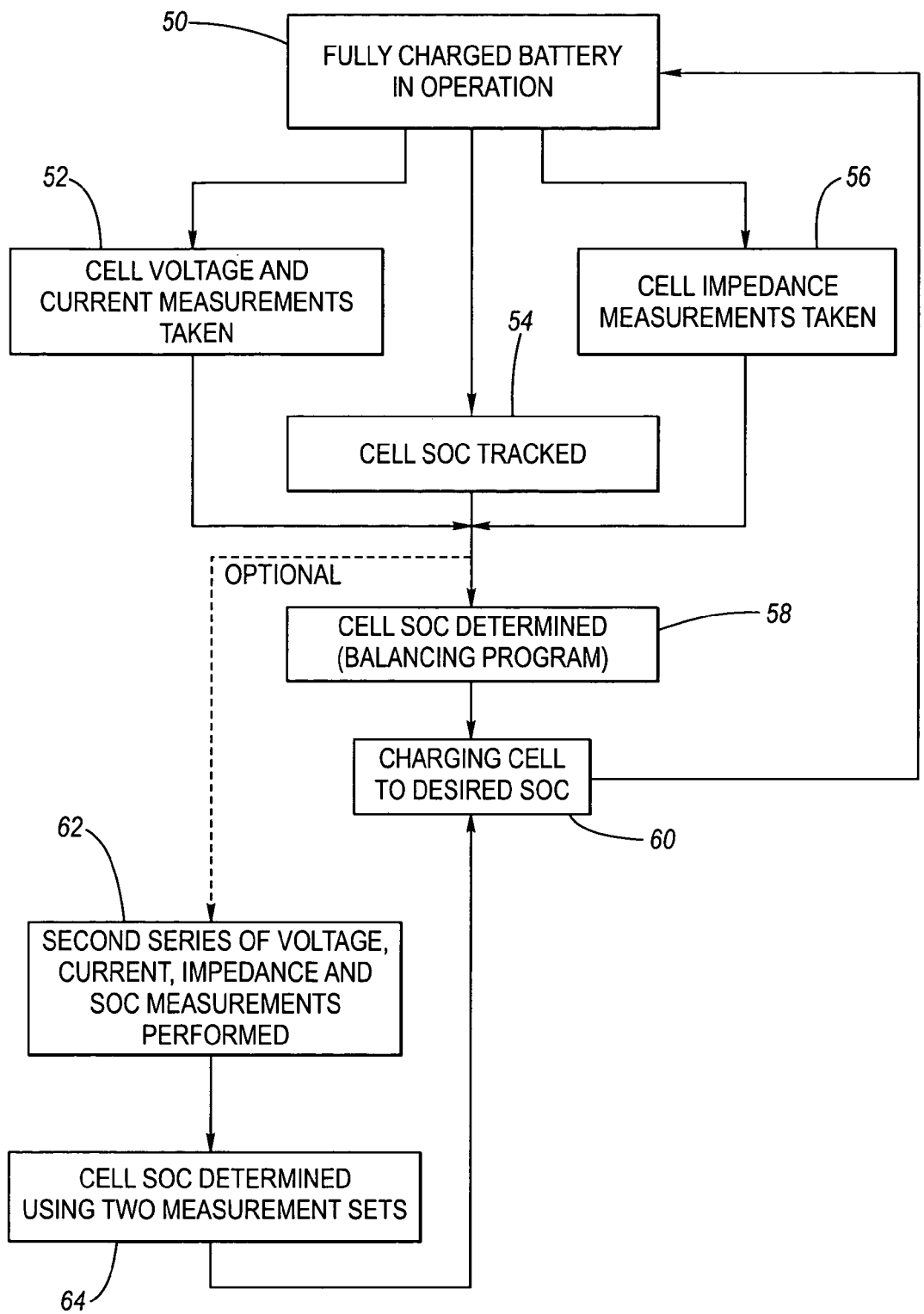
FIG. 2 is a flowchart illustrating a method in accordance with the present invention.

Referring now to FIGS. 1–2, a method in accordance with the present invention will now be set forth. It should be understood that the following functionality, unless specifically described with respect to a particular structure of the illustrated embodiment of FIG. 1, or which has already been specifically described in connection with a specific structure of FIG. 1, may be implemented in software suitable for execution by CPU 38.

Referring specifically to FIG. 2, in step 50, fully charged battery pack 10 is in operation. "Fully charged" may take on different meanings to reflect changing charging target SOC levels for individual cells according to the invention. For example, the charging default from the "factory" may be initially preset to 100% of the maximum state of charge or set at some level less than 100%, depending on the expected use (i.e. some regenerative energy expected to be encountered). Battery pack 10 is in operation when application 12 is activated. This may include operating a hybrid vehicle or an electric vehicle, however, these applications are merely exemplary and the invention is not limited to these uses.

In step 52, voltage sensors 32 and current sensor 34 sample the voltage and current being drawn by application 12 from individual cells 30 of battery pack 10 at a predetermined time rate. This is an iterative step in the method that results in the accumulation of a series of time-based measurements. This step also provides data necessary to develop a load profile for battery pack 10.

In step 54, the respective, real-time SOC of each cell 30 is tracked, as with voltage and current, at a predetermined time rate. This step also provides data necessary to calculate the target SOC for individual cell 30 and monitor the amount of regenerative energy absorbed by each cell 30.

In step 56, impedance block 35 samples and/or otherwise determines respective impedance levels of individual cells 30, again, at a predetermined time interval. It should be understood, however, that the impedance determination need not occur at predetermined intervals, and may occur at uneven intervals, dynamically, etc.

In step 58, CPU 38, coupled with balancing program 42, calculates a respective, target SOC for each cell 30 of battery pack 10 based upon the data collected in steps 52–56. The voltage, current, SOC and impedance determinations present a picture of usage of battery pack 10 and the individual cells thereof. This picture is a load profile presented to battery pack 10. The load profile is developed by CPU 38 executing algorithms provided in balancing program 42. The determinations also illustrate the behavior of each cell 30. For example, large steady voltage drains from cells 30 indicate application 12 is requiring a high rate of energy delivery from battery pack 10 and therefore cells 30 should be charged to a high state-of-charge (SOC) to accommodate the battery pack usage parameters. If the measurements indicate the application 12 is producing regenerative energy for battery pack 10 to accept, cells 30 should be charged to a SOC lower than the respective maximum SOC for the cells 30 when application 12 requires energy delivery only to application 12. If application 12 requires both energy delivery and regenerative energy acceptance by battery pack 10, battery pack 10 must be adjusted to address both characteristics. Further, each cell 30 in battery pack 10 has a different capacity for energy delivery as well as impedance characteristic. Age, number of charge/recharge cycles, variations in manufacturing and materials all affect a cell's 30 impedance characteristics. The nature of the use may be used to select or modify the selected equalization balancing regimen.

Figure 3:
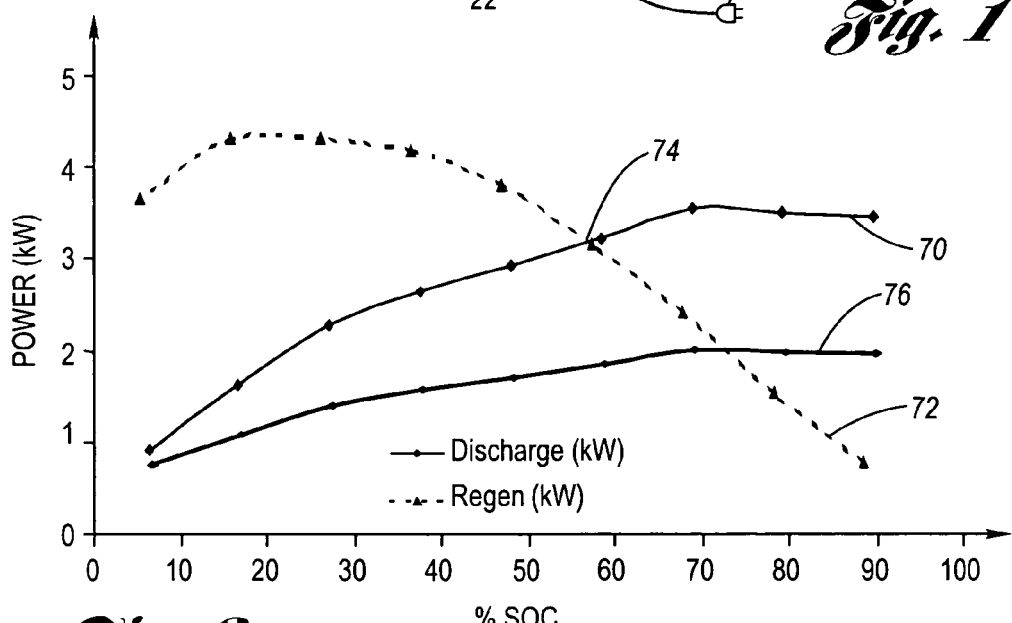
FIG. 3 is a graph of energy delivery and regenerative energy acceptance curves for an individual cell in a battery pack.

FIG. 3 illustrates how a target SOC for a particular cell 30 in pack 10 may be determined. Each cell 30 has a unique discharge rate curve 70 (@23° C.) and regenerative energy acceptance curve 72 (@23° C.). In FIG. 3, the x-axis corresponds to a SOC level (expressed as a percentage), while the y-axis corresponds to power (expressed in KW), either into the cell or out of the cell. As shown by FIG. 3, when cell 30 is charged to at an increased percentage SOC, a higher rate of energy delivery is available for the application. When cell 30 is at a low percentage SOC, cell 30 can accept more regenerative energy (or power in). It warrants noting that these relationships are not linear. That is, the cell cannot deliver a maximum power uniformly from a fully charged level until it is discharged to zero. Rather, as shown, the available power output decreases in an irregular and non-linear way with decreasing levels of SOC. The same observation holds true for input power to the cell. The cell cannot accept a uniform, maximum input power across all SOC levels. Rather, the cell can accept relatively greater amounts of energy at low SOC levels, but which generally decreases in a non-linear fashion with increasing SOC levels.

Balancing program 42 therefore is configured to process voltage, current, SOC and impedance, and, in-effect, model the graph as illustrated in FIG. 3 for each cell. Using the model so established, program 42 can ascertain a target SOC level for that particular cell 30. As an example, FIG. 3 illustrates the discharge rate and regenerative energy acceptance curves for one cell 30 in battery pack 10 that are generated by balancing program 42 using the parameters discussed above. Balancing program 42 also performs algorithms and, in this example, the results indicate battery pack 10 usage involves both acceptance of regenerative energy as well as energy discharge. In one embodiment, for example, balancing program 42 may be configured to determine the target SOC for cell 30 as that level where the discharge rate and regenerative acceptance curves intersect, designated by reference numeral 74, while meeting overall capacity requirements of battery pack 10 by application 12. It should be understood, however, that other approaches are possible, having due regard for different weightings as to acceptance of regenerative energy on the one hand (trace 72), and the supply of energy (trace 70) on the other hand. For reference, trace 76 shows the cell's discharge characteristic at −25° C.

As to the selection of point 74 in FIG. 3, it should be understood that energy-dominant usage cycles require maximizing performance on each individual cell's energy capacity. Power-dominant usage cycles require maximizing performance on each individual cell's internal impedance (discharge and recharge impedance optimization). In multiple-cell lithium battery systems, these goals are not necessarily congruent. However, cell balancing can be performed to achieve partial power or partial energy performance, perhaps at the cost of the other. Depending on the usage cycle, the cell balancing can be weighed more heavily toward either goal. The present invention is configured to determine the weight of energy dominance versus power dominance (i) dynamically or actively during operation of the application based on observations or measurements of the power flows in and out of the battery pack; or (ii) through usage cycle design (i.e., pre-programmed at time of manufacture).

It should be understood that even as to the latter ("usage cycle design"), where the balance (i.e., relative weightings) between energy and power is pre-programmed in advance of in-application usage, the actual balancing point (e.g., point 74) can be dynamically determined via monitoring of the ever-changing characteristics of each individual cell (i.e., the cell's unique characteristics can change with both age and the number of charge/discharge cycles). In a further embodiment, both the relative weightings between power-based dominance and energy-based dominance, and, the actual discharge rate and energy acceptance curves associated with each cell may be pre-programmed (e.g., are fixed or static relative to subsequent in-application usage).

In addition to the foregoing, the invention contemplates that in some circumstances, it may be desired to establish (i) either an overall minimum state of charge or (ii) an overall minimum energy capacity (e.g., for an electric vehicle application, to ensure a minimum available travel range for the vehicle).

The above example may be used where the application is characterized by both energy-based use and power-based use. For more purely energy-based applications, the cells may be charged to maximize capacity (i.e., to a maximum voltage indicative of SOC for the cell). This approach would include state of charge balancing (voltage balancing) so that all the cells reach a maximum capacity. On the other hand, for more purely power-based applications, the cells may be equalized for internal impedance (i.e., as this parameter affects the ability of a cell to receive or take on input energy such as regenerative energy). This approach would involve impedance balancing and the cells may ultimately end up at different levels of SOC.

In effect, the invention provides that the cells may be equalized to (i) internal impedance (i.e., relating to regen acceptance), (ii) voltage indicative of a SOC so as to optimize discharge performance or (iii) a weighted combination of both.

With continued reference to FIG. 2, in step 60, each one of the cells 30 is charged to the respective target SOC as determined by balancing program 42 in step 58. This charging routine may take the form of using conventional external chargers 22, as discussed and shown in FIG. 1, which would entail ceasing use of battery pack 10, "plugging" charger 22 into battery pack 10, and then charging battery pack 10 pursuant to the defined charging strategy of step 58, controlled by charger controller 40. The charging routine could also take the form of "real-time" regenerative recharging which would allow for the charging of battery pack 10 as it is live in operation, without discontinuing use. Regardless of the mechanism chosen to carry out the charging routine, the charging strategy is determined in the same manner, and presented to the chosen mechanism in the same way. In the specific example illustrated in FIG. 3, cell 30 would be charged to 57.9% SOC by charger 22 (or regenerative energy acceptance) and controlled by charge controller 40. Balancing program 42 would perform algorithms to determine SOC for each cell, because as discussed above, each cell 30 has a different energy discharge and energy acceptance curve. Because each cell 30 has its own characteristics tracked, unique curves for each cell may be obtained. Therefore, each cell 30 should be charged to its target SOC to balance the competing goals of energy delivery with regenerative energy acceptance. In the situation where the application 12 requires only steady-state discharge of energy, balancing program 42 may be configured to determine that cell 30 should be charged to a SOC level at which maximum energy delivery could be obtained, based upon the data contained in graph of FIG. 3.

Referring again to FIG. 2, in step 60, optionally, a second series of measurements and/or determinations may be made, in the manner described in steps 52–56. In step 62, the measurements are used by CPU 38, coupled with balancing program 42, to develop a second load profile seen by the battery. In step 64, balancing program 42 may be configured to use the first and second load profiles and measurements of the electrical characteristics of cell 30 to calculate the desired target SOC for each individual cell 30. Step 60 is then executed, and charger 22 charges cells 30 to the respective target SOC levels, controlled by charge controller 40. The method is repeated at multiple predetermined time intervals for each cell 30. Cells 30 may all be charged to identical SOC or each cell may have its own SOC. The SOC for one cell 30 at one moment may not be the same SOC for the same cell at a point later in time as additional data are processed by balancing program 42. As the energy needs presented by application 12 change in time, the method and apparatus described above allow the battery pack 10 and the individual cells 30 to be adjusted to serve the changing energy needs.

The present invention provides improved performance for functions such as regenerative braking, cold-weather starting or range extending. The invention may also extend the battery life by adapting to aging batteries, thereby reducing warranty costs, for example.

It is to be understood that the above description is merely exemplary rather than limiting in nature, the invention being limited only by the appended claims. Various modifications and changes may be made thereto by one of ordinary skill in the art which embody the principles of the invention and fall within the spirit and scope thereof.

The invention claimed is:

1. A method of controlling a rechargeable battery pack having a plurality of cells suitable for use in an application comprising the steps of:
   determining a desired discharge delivery rate for said battery pack based upon at least one of (i) usage data collected during operation of the application and (ii) predetermined expected usage data;
   determining a desired regenerative energy acceptance for said battery pack based upon at least one of (i) regeneration data collected during said operation of the application and (ii) predetermined, expected regeneration data;
   determining a respective target state-of-charge (SOC) for each one of said plurality of individual cells based upon said determined, desired discharge delivery rate and regenerative energy acceptance; and
   charging said individual cells of said battery to in accordance with said respective target SOCs.

2. The method of claim 1 wherein said step of determining said respective target SOCs includes the substep of:
   determining respective weighting factors applied to said desired discharge delivery rate and said desired regenerative energy acceptance.

3. The method of claim 2 wherein said step of determining said respective target SOCs is further performed based upon at least one of either (i) an overall minimum state of charge or (ii) a minimum energy capacity desired for said battery pack.

4. The method of claim 1 wherein said determined, target state-of-charge for individual cells differs between cells.

5. The method of claim 1 wherein said step of determining the desired level of regenerative energy accept includes the substep of:
   selecting said regeneration data so as to include individual cell internal impedance determinations.

6. The method of claim 1 wherein said step of determining the desired discharge delivery rate includes the substep of:
   selecting said usage data so as to include measurements of electrical characteristics of power drawn from said individual cells as a function of time.

7. The method of claim 6 further including the step of determining a first load profile based on said electrical characteristic-measurements for use in determining said respective target states-of-charge for said cells.

8. The method of claim 7 further including the step of determining a second load profile.

9. The method of claim 8 wherein said step of determining said respective target state-of-charge (SOC) levels includes the substep balancing said first load profile and said second load profile.

10. The method of claim 1 wherein said application for said battery pack includes a dynamoelectric machine alternatively configured for propulsion and for production of regenerative energy.

11. A rechargeable battery pack suitable for use with an application, comprising:
    a plurality of battery cells each configured to produce electrical power on a battery pack input/output terminal thereof;
    means for determining a desired discharge delivery rate of said battery pack based upon at least one of usage data collected during operation of the application and predetermined, expected usage data;
    means for determining a desired regenerative energy acceptance based upon at least one of regeneration data collected during operation of the application and predetermined, expected regeneration data;
    means for calculating a respective target state-of-charge (SOC) for each one of said battery cells based on said usage data and said regeneration data; and
    means for charging said battery cells in accordance with said respective target SOCs.

12. The battery pack of claim 11 wherein said data include impedance measurements of said cells.

13. The battery pack of claim 12 wherein said data includes measurements of electrical characteristics of power drawn from said cell or cells as a function of time.

14. The battery pack of claim 13 wherein said calculating means includes a central processing unit (CPU) configured to determine said desired state-of-charge for said battery cell or cells, using said impedance level measurements and said electrical characteristics measurements.

15. The battery pack of claim 11 wherein said means for calculating said respective target SOCs includes means for determining respective weighting factors applied to said desired discharge delivery rate and said desired regenerative energy acceptance.

16. The rechargeable battery pack of claim 15 wherein said means for determining said target state-of-charge for the individual cells is further responsive to at least one of (i) an overall minimum state of charge or (ii) a minimum energy capacity desired for said battery pack.

17. The rechargeable battery pack of claim 11 wherein said means for charging includes a unit that charges said battery cell or cells to state-of-charge levels that differ between cells.

* * * * *